UNITED STATES PATENT OFFICE.

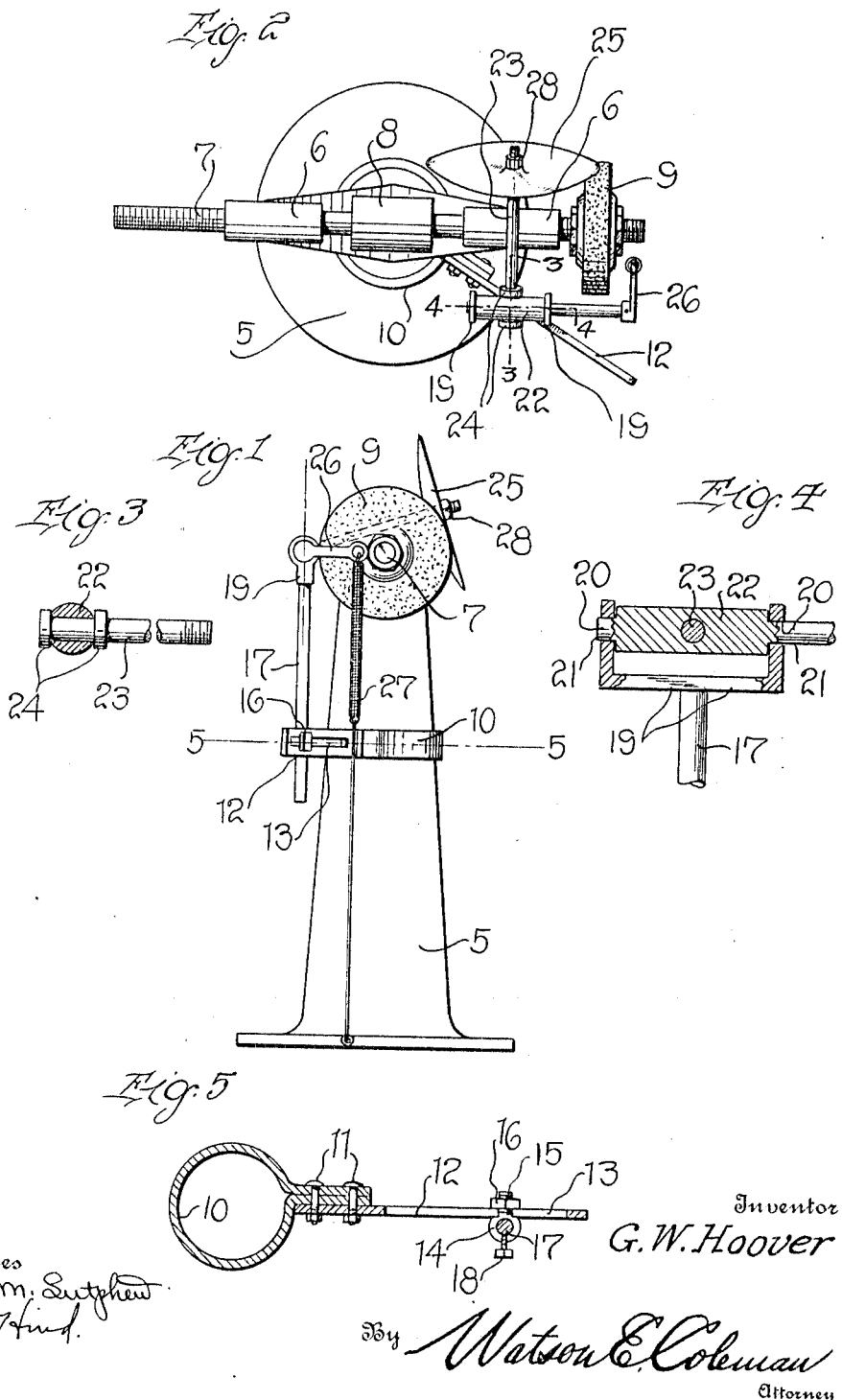

GEORGE W. HOOVER, OF TIPTON, KANSAS, ASSIGNOR TO JOSEPH F. MERGEN, OF TIPTON, KANSAS.

DISK-SHARPENING MACHINE.

1,117,383.  Specification of Letters Patent.  Patented Nov. 17, 1914.

Application filed March 18, 1914. Serial No. 825,617.

*To all whom it may concern:*

Be it known that I, GEORGE W. HOOVER, a citizen of the United States, residing at Tipton, in the county of Mitchell and State of Kansas, have invented certain new and useful Improvements in Disk-Sharpening Machines, of which the following is a specification, reference being had to the accompanying drawings.

This invention relates to improvements in disk sharpening machines and has for its primary object to provide an improved disk supporting and adjusting device whereby the edge of the disk may be held in proper bearing engagement upon the periphery of the emery wheel.

The invention has for another of its objects to provide a supporting rod or standard and means for adjustably mounting the same upon the base of the machine, a member journaled in the upper end of said supporting rod, means for rotatably mounting a disk upon said member, and a spring to yieldingly hold said member against turning movement and maintain the edge of the disk in contact with the emery wheel.

The invention has for a further object to produce a disk supporting and adjusting device of the above character which may be readily applied to any of various makes of sharpening or filing machines now in general use, said device as a whole being comparatively simple in its construction, strong, durable and efficient in practical use and capable of manufacture at a small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a sharpening machine having my invention applied thereto. Fig. 2 is a top plan view. Fig. 3 is an enlarged section taken on the line 3—3 of Fig. 2. Fig. 4 is a section taken on the line 4—4 of Fig. 2. Fig. 5 is a section taken on the line 5—5 of Fig. 1.

Referring in detail to the drawings 5 indicates the base or standard of a sharpening machine which is illustrated as of cylindrical form, and tapers to its upper end where said standard is formed with the oppositely extending arms 6. In these bearing arms the shaft 7 is mounted and upon this shaft between said arms a band wheel or pulley 8 is fixed. Upon one end of the shaft 7 an abrading wheel 9 of emery or other material is fixed. It will be apparent as the subject matter of this application is more fully disclosed that the foregoing description is only illustrative of one type of the sharpening machine to which the invention is applicable.

In the practical embodiment of my invention I employ a metal clamping band 10 which encircles the upper portion of the machine standard 5. The ends of this band are secured together by means of clamping bolts 11 and between the same one end of a bar 12 is disposed and rigidly secured to the ends of the band by said bolts. This bar is formed with a longitudinal slot 13 in which a threaded shank 15 formed upon the sleeve 14 is disposed. The nut 16 is threaded upon the stud 15 whereby the sleeve 14 may be securely fastened in its adjusted position upon the bar 12.

A rod 17 is mounted in the sleeve 14 and is adapted to be adjustably secured therein by means of a suitable set screw indicated at 18 which is threaded in said sleeve. The upper end of this rod is forked or provided with arms 19 the extremities of which are longitudinally extended and provided with openings 20 to loosely receive the trunnions 21 upon the ends of a rotatable member 22. This member is provided with a central opening in which a rod 23 is rotatably mounted, said rod extending at right angles to the rotative axis of the member 22. Adjustable sleeves or collars 24 are arranged upon the rod 23 and upon opposite sides of the member 22 whereby longitudinal shifting movement of the rod through said member is effectually prevented.

25 indicates the disk to be sharpened. This disk is adapted to be inserted over the rod 23, said rod extending through the central axle opening in the disk. One of the trunnions 21 of the member 22 is of greater length than the other, and to the same an arm 26 is attached in any desired manner. To the end of this arm one end of a coil spring 27 is connected, the other end of the spring being secured to the floor or other stationary member. The disk receiving rod 23 is threaded to receive a nut 28 which is adapted for engagement with the inner concave face of the disk 25 to secure the same in position upon the rod against one of the collars 24.

Having above described the construction and arrangement of the several parts of my invention, its operation will be understood as follows: The bolts 11 are first loosened and the band 10 turned upon the machine standard 5 to dispose the bar 12 in the desired position with respect to the shaft 7 in accordance with the diameter of the disk to be sharpened. The disk is now engaged upon the rod 23 and the nut 28 adjusted thereon in clamping engagement with the concave face of the disk, in which position of the disk the edge thereof will contact with the periphery of the emery wheel 9. The spring 27 by its contractile action maintains a yielding pressure of the disk upon the emery wheel. As the emery wheel is rotated and the edge of the disk is sharpened, said disk is being constantly turned so that wear upon the edge of the disk in the operation of the emery wheel will be uniform. The shaft 23 upon which said disk is fixed, rotates freely in the spring held member 22. By the provision of the adjustable supporting rod 27, said rod may be easily and quickly moved longitudinally upon the bar 12 or vertically with respect thereto so as to properly position the edge of the disk upon the periphery of the wheel.

From the foregoing it will be seen that I have produced a very desirable and efficient disk supporting and adjusting means for use in connection with sharpening machines whereby disks of various diameters such as are used upon cultivators or plows may be easily and quickly mounted in position to be sharpened. The several parts of the invention are of very simple form, and it will thus be obvious that the device as a whole may be produced at small manufacturing cost.

While I have shown and described the preferred construction and arrangement of the several elements employed, it will be understood that the invention is susceptible of considerable modification therein, and I therefore reserve the privilege of resorting to all such legitimate changes as may be fairly embodied within the spirit and scope of the invention as claimed.

What is claimed is:

A device of the class described including a standard and an abrading wheel rotatably mounted thereon, a clamping band encircling the upper portion of the said standard and secured at its ends, a bar rigidly connected to the ends of the clamping band and having a longitudinal slot formed therein, a sleeve having a threaded shank adjustably mounted in the longitudinal slot of the said bar, a nut mounted upon the threaded shank to hold the same in an adjusted position, a vertically disposed adjustable rod mounted in the said sleeve, a set screw carried by the sleeve and adapted to engage said rod to retain the same in an adjusted position, the upper end of the rod being bifurcated and a rotatable member mounted therein having a central opening, one of the trunnions of the said rotatable member being substantially longer than the other, a rotatable rod mounted in the central opening of the said rotatable member adapted to receive the disk to be sharpened and extending at right angles to the rotative axis of the first mentioned rotatable member, an arm connected to the longer trunnion of the rotatable member and extending at right angles thereto and a contractile spring connected at one end to the base and the other end connected to the said arm to normally hold the disk into engagement with the abrading wheel.

In testimony whereof I hereunto affix my signature in the presence of two witnesses.

GEORGE W. HOOVER.

Witnesses:
B. A. PHILLIPS,
ROY HAYS.

Copies of this patent may be obtained for five cents each, by addressing the "Commissioner of Patents, Washington, D. C."